United States Patent [19]

Eichfeld et al.

[11] Patent Number: 5,371,832
[45] Date of Patent: Dec. 6, 1994

[54] FUZZY LOGIC CONTROLLER HAVING HIGH PROCESSING SPEED

[75] Inventors: Herbert Eichfeld; Thomas Kuenemund, both of Munich, Germany

[73] Assignee: Siemens Aktiengesellschaft, Munich, Germany

[21] Appl. No.: 22,447

[22] Filed: Feb. 25, 1993

[30] Foreign Application Priority Data

Jun. 12, 1992 [DE] Germany ............................ 4219348

[51] Int. Cl.$^5$ .............................................. G06F 15/18
[52] U.S. Cl. .......................................... 395/3; 395/11
[58] Field of Search ............................ 395/3, 11, 900

[56] References Cited

U.S. PATENT DOCUMENTS 5,165,011 11/1992 Hisano ................................... 395/11
5,184,131 2/1993 Ikeda ...................................... 395/3
5,263,125 11/1993 Viot et al. ............................. 395/3
5,280,624 1/1994 Iked ........................................ 395/3

OTHER PUBLICATIONS

"Architecture of a CMOS Fuzzy Logic Controller with Optimized Memory Organisation and Operator Design" by H. Eichfeld, et al, Conference Papers of the First International Conference on Fuzzy Systems FUZZ-IEEE '92, pp. 1317–1323.

Primary Examiner—Allen R. MacDonald
Assistant Examiner—Tariq R. Hafiz
Attorney, Agent, or Firm—Hill, Steadman & Simpson

[57] ABSTRACT

A fuzzy logic controller is composed of a fuzzification circuit (FUZ), a rule decoder (RDEC), a rule evaluation circuit (RA), an inference circuit (INF), a defuzzification circuit (DFUZ) and a sequencer (CTRL). Numbers (NA) for linguistic values of the output variables together with selection signals (SM) for the definition of the input variables affected by the respective rule formed in the rule decoder and are supplied to the rule evaluation circuit in addition to the values (ME) of the affiliation functions for the linguistic values of the input variables. A weighting signal (G) is generated in the rule evaluation circuit for every linguistic value of the output variables. The advantages obtainable are the high processing speed, the low requirement for chip area, the variable rule format and the selection possibility of different operation modes in the rule evaluation circuit, the inference circuit and the defuzzification circuit.

20 Claims, 9 Drawing Sheets

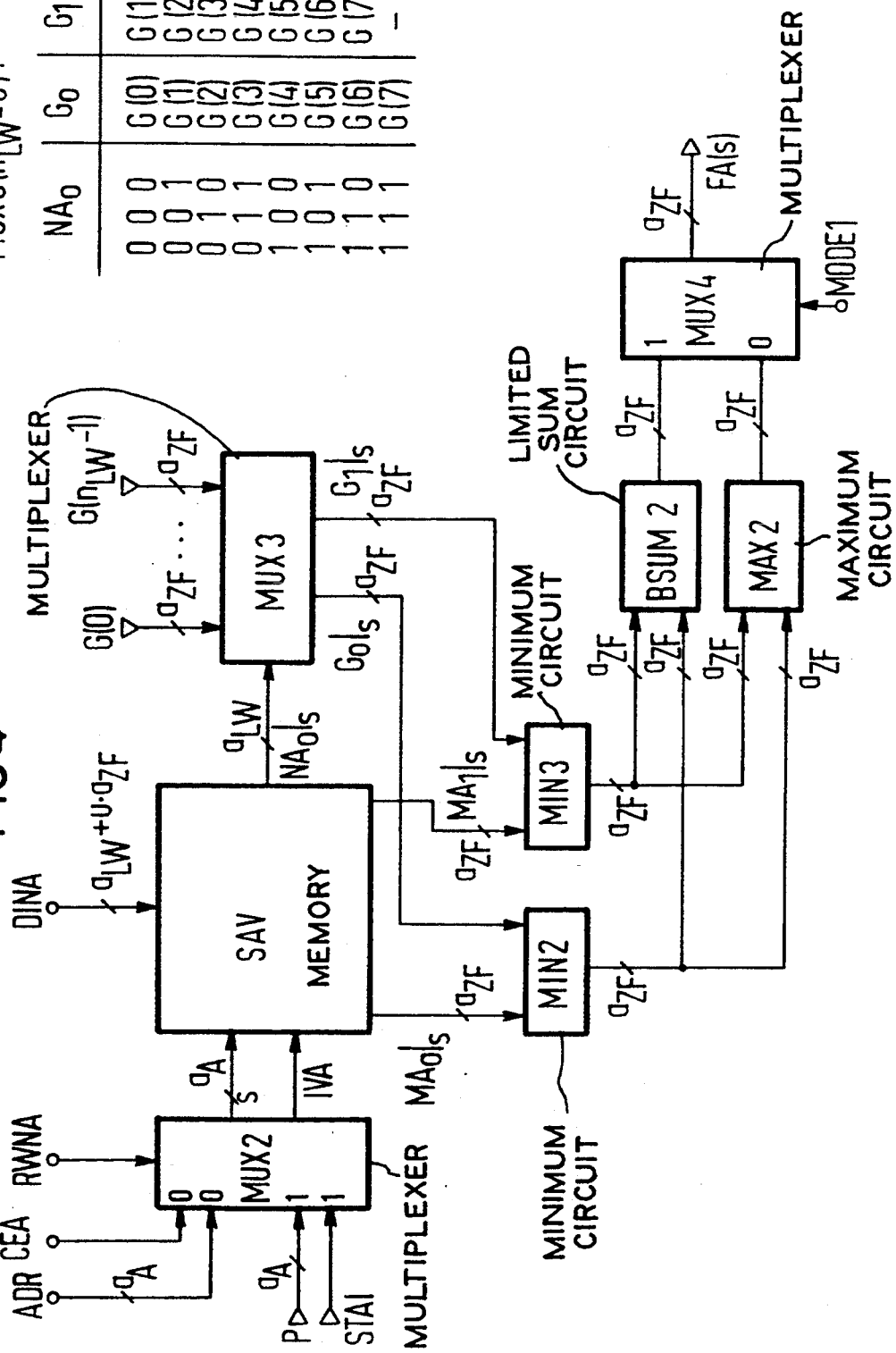

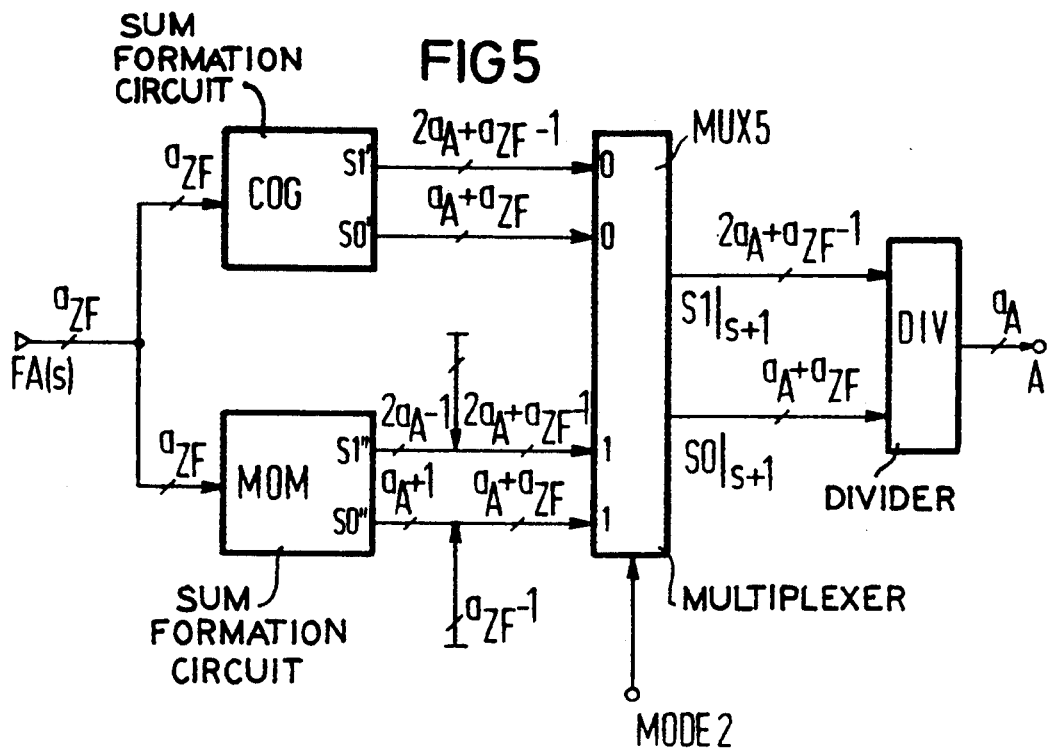
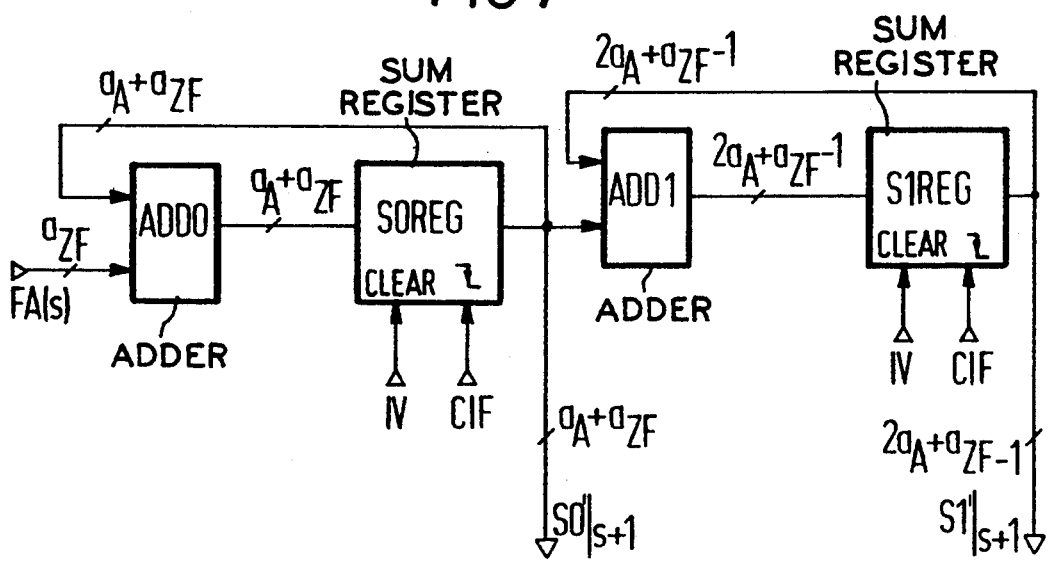

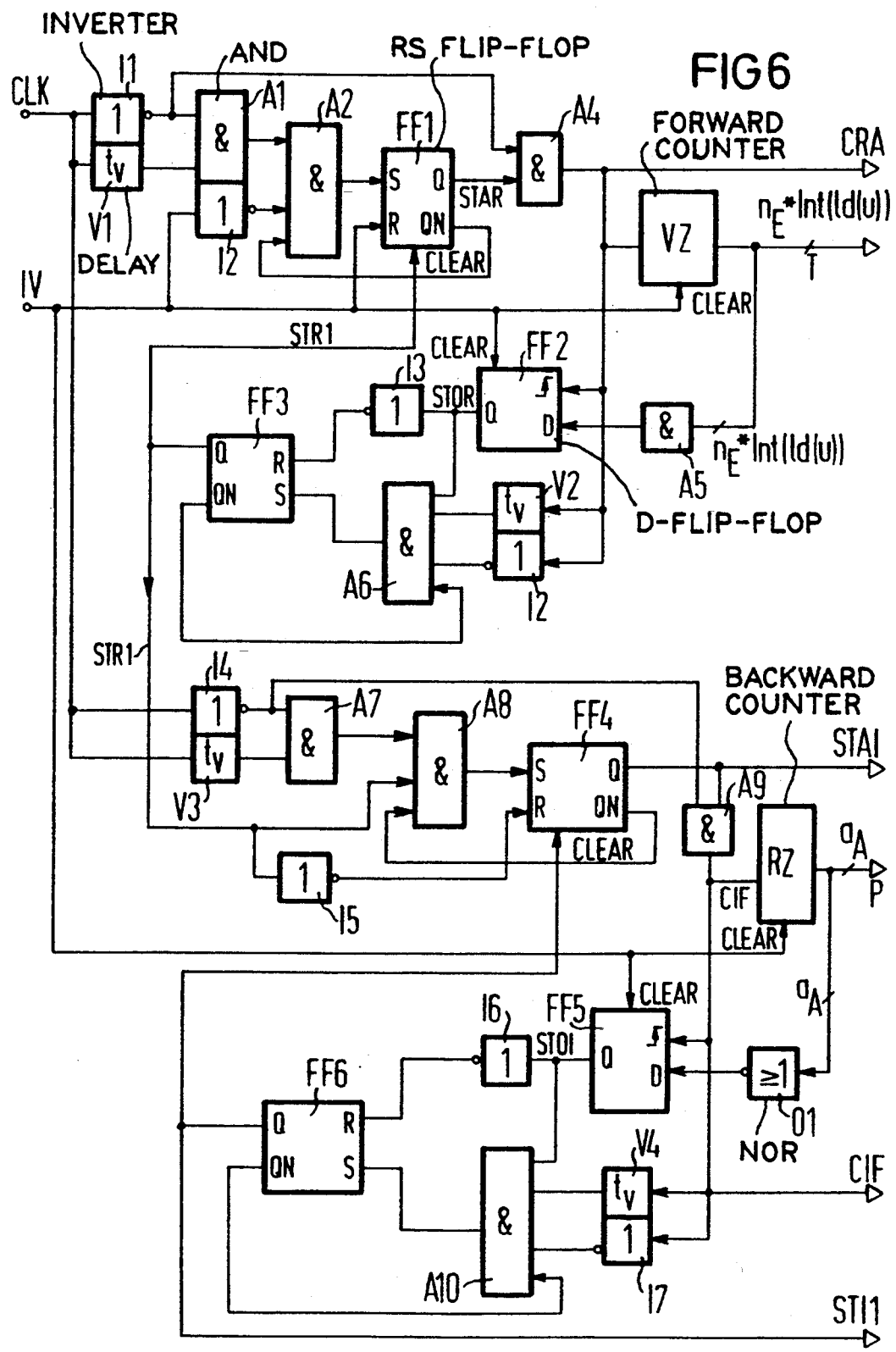

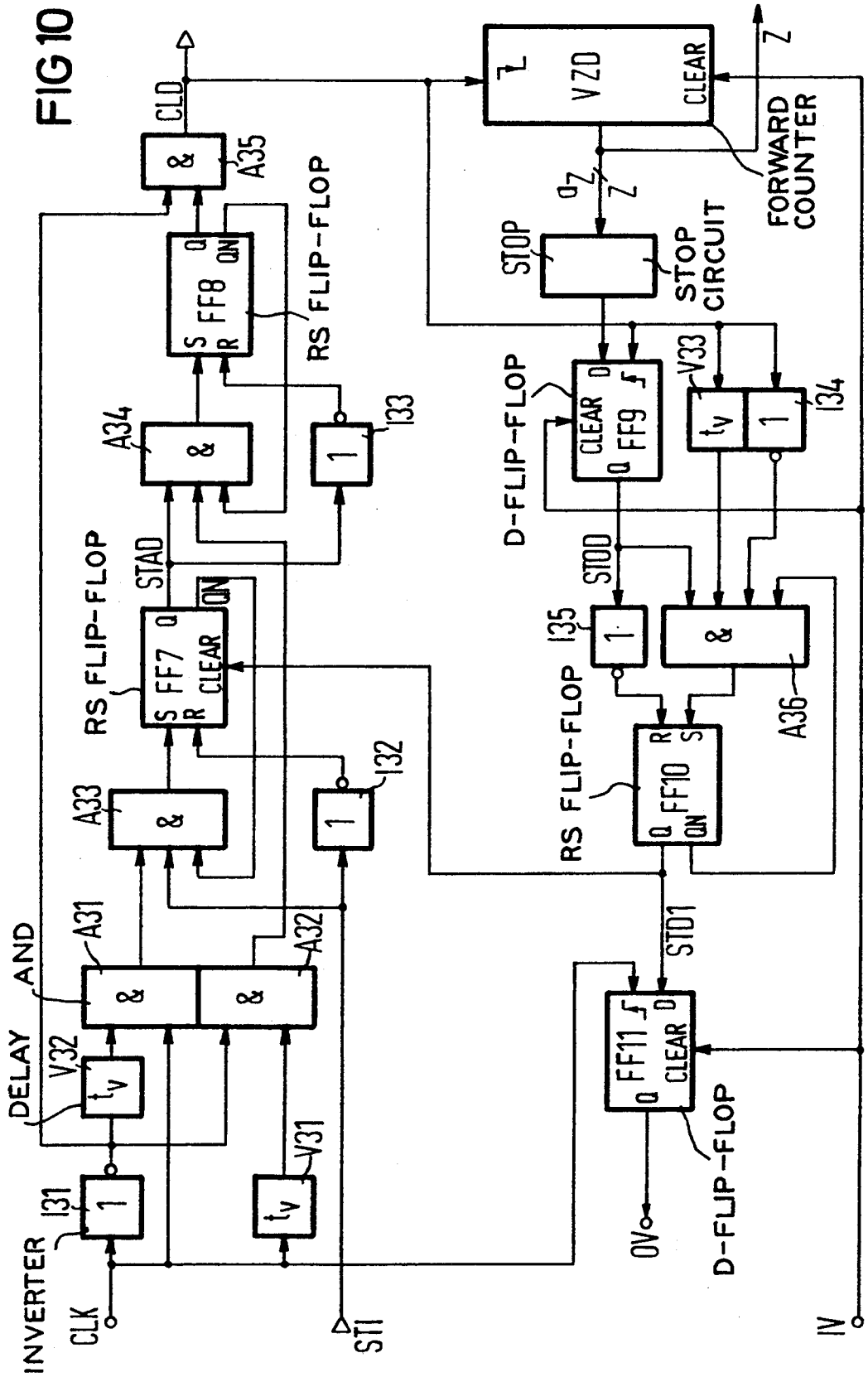

FUZZY LOGIC CONTROLLER HAVING HIGH PROCESSING SPEED

BACKGROUND OF THE INVENTION

Fuzzy logic controller having optimized storage organization is disclosed, for example, in the Conference Papers of the First International Conference on Fuzzy Systems FUZZ-IEEE '92, pages 1317 through 1323. Such a fuzzy logic controller allows an optimized storage organization on the basis of its logic, as a result whereof the required memories can be unproblematically realized on the semiconductor chip of the fuzzy logic controller as a consequence of the low memory requirement.

SUMMARY OF THE INVENTION

It is an object of the present invention to provide a fuzzy logic controller that, given optimally low chip area, allows an optimally high processing speed and that has an optimally high flexibility in the architecture, in the control format and in the algorithm selection. This object is inventively achieved by a Fuzzy logic controller having the following elements. In a fuzzification circuit, upon collaboration of a memory for the input variables, $u^nE$ combinations of numbers for linguistic values of the input variables affected by the distinct values and values of the affiliation functions of the respectively affected linguistic values of the input variables are generated from distinct, externally supplied values of $n_E$ input variables, whereby a maximum of u affiliation functions respectively overlap and, as a result thereof, a maximum of u linguistic values are simultaneously affected by a distinct value of the input variables. In a rule decoder, in conformity with a linguistic protocol stored in it, signals for defining numbers of the linguistic values of the output variables affected by a respective rule of the linguistic protocol are formed from the $u^nE$ combinations of numbers. In a rule evaluation circuit a weighting signal for each of $n_{LW}$ linguistic values of the output variables is generated from the signals for defining the numbers of linguistic values of the output variables and the values of the affiliation functions of the respective linguistic values of the output variables using at least one circuit for the formation of a nondistinct operation. In an inference circuit, upon collaboration of a memory and at least one further circuit for the formation of a nondistinct operation, signals for nondistinct unification sets at the respective locations are formed from the weighting signals for all locations of the area of distinct values of the output variables. In a defuzzification circuit, upon collaboration of at least one evaluation circuit, distinct, externally available values of the output variables are generated from the signals for the nondistinct unification sets of all locations of the area of distinct values of the output variables. In a sequencer it is effected that, after the $u^nE$ combinations of numbers, the weighting signals for the $n_{LW}$ linguistic values of the output variables are calculated once for every set of distinct values of the $n_E$ input variables and these weighting signals calculated once are employed in the inference circuit for all locations of the area of distinct values of the output variables.

An advantage of the present invention is that the fuzzy logic controller cannot only be independently realized on its own chip, but can also be realized as part of a conventional microcontroller because of its low requirement for chip area.

Further advantageous developments of the fuzzy logic controller of the present invention are as follows.

Selection signals for definition of the input variables affected by a respective rule are additionally formed in the rule decoder. These selection signals are supplied to the rule evaluation circuit.

The sequencer also effects that nondistinct unification sets for already calculated locations of the area of distinct values of the output variables are simultaneously further-processed while a respective signal for the nondistinct unification set for a location of the area of distinct values of the output variables is calculated in the inference circuit.

The rule evaluation circuit has both a circuit for the formation of a limited sum as well as a maximum circuit that serve as first and second circuits for the formation of a nondistinct operation. Alternatively, one of the two circuits is used for the formation of the weighting signals dependent on an externally suppliable rule evaluation select signal.

The inference circuit has both a circuit for the formation of a limited sum as well as a maximum circuit that serve as first and second, further circuits for the formation of a nondistinct operation. Alternatively, one of the two circuits is used for the formation of the signals for the nondistinct unification set at the respective locations dependent on an externally suppliable inference select signal.

The defuzzification circuit has both a circuit for the calculation of the center of gravity as well as a circuit for the calculation of the mean of maxima that serve as first and second evaluation circuits. Alternatively, one of the two evaluation circuits is used for the formation of the distinct values of the output variables dependent on an externally suppliable defuzzification select signal.

The rule decoder is programmable logic. The memory for the input variables and/or the memory for the output variables is a random-access memory. The fuzzy logic controller together with its memory for the input variables and its memory for the output variables represents a component part of a conventional microcontroller.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 4 is a detailed circuit diagram of the inference circuit of FIG. 1;

FIG. 4A is a value table for a multiplexer in the FIG. 4 inference circuit;

FIG. 5 is a detailed circuit diagram of the defuzzification circuit of FIG. 1;

FIG. 6 is a detailed circuit diagram of the sequencer of FIG. 1;

FIG. 7 is a detailed circuit diagram of the defuzzification circuit of FIG. 5;

FIG. 10 is a detailed circuit diagram of a sequencer of the divider of FIG. 9.

DESCRIPTION OF THE PREFERRED EMBODIMENT

The basic principle of a digital fuzzy logic controller is based on distinct input values for $n_E$ input variables being respectively supplied to the fuzzy logic controller with a resolution of $a_E$ bits. Subsequently, an image of the distinct input values onto linguistic values of the respective input variables, whereby every input variable has $n_{LW}=2^{a}LW$ linguistic values that, due to the nondistinct allocation (fuzzy logic), have overlapping affiliation functions with a maximum overlap degree u greater than or equal to 2 and less than $n_{LW}$. Designations between the linguistic values of the input variables and the linguistic values of the output variables can be produced using a linguistic protocol or control set in the form of IF/THEN rules, whereby an IF part is formed of a combination of individual conditions for the input variables and whereby a linguistic value of an output variable usually appears as a consequence (THEN part). A nondistinct operation of the input and output variables occurring in a respective rule occurs by means of the affiliation functions of the linguistic values of the input variables and the linguistic values of the output variables, whereby both the affiliation functions of the linguistic values of the input variables as well as the affiliation functions of the linguistic values of the output variables have, for example, a resolution of $a_{ZF}$ bits. A nondistinct unification set is formed from the results of the nondistinct operations on the basis of what is referred to as an inference. A distinct output value having the resolution $a_A$ bits is produced from the nondistinct unification set on the basis of what is referred to as a defuzzification.

Figure 1:
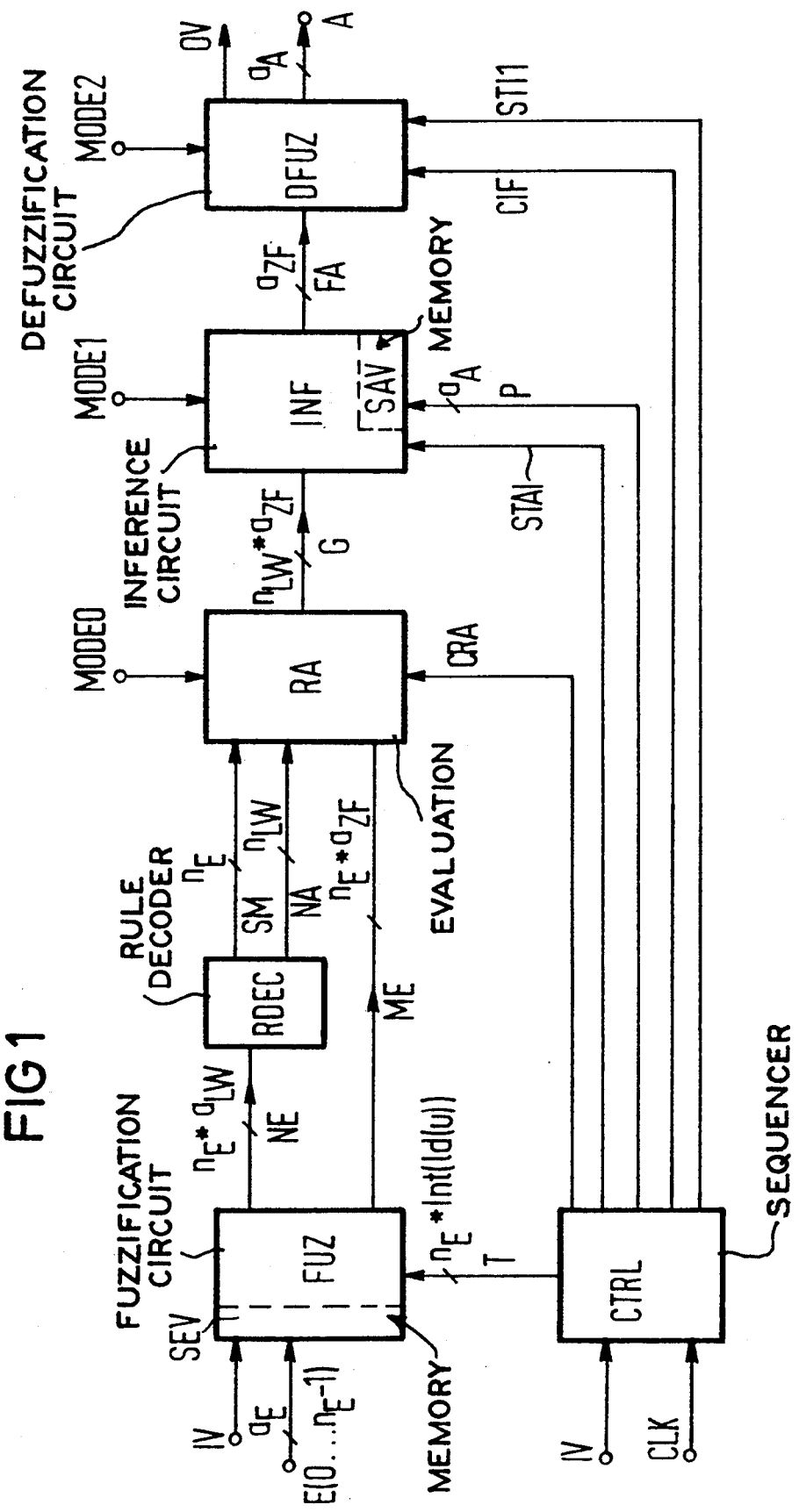
FIG. 1 is a block circuit diagram of a fuzzy logic controller of the present invention for an output variable.

FIG. 1 shows a block circuit diagram of a Fuzzy Logic Controller (FLC) of the present invention that has a fuzzification circuit FUZ with a memory SEV for the input variables, a rule decoder RDEC, a rule evaluation circuit RA, an inference circuit INF, a defuzzification circuit DFUZ and a rule unit CTRL. The memory SEV of the fuzzification circuit FUZ is externally supplied with $n_E$ distinct input values E (0 ... $n_E-1$) having the resolutions $a_E$ and with a signal IV (input valid) for confirmation of valid input data. Further, the fuzzification circuit FUZ is supplied with fuzzification control signals T coming from the rule unit CTRL that are $n_E *$ Int (ld(u)) bits wide, whereby Int (x) here and below denotes the smallest natural number greater than x. Also, $n_E$ numbers NE of the affiliation functions of the linguistic values of the input variables are respectively formed with the resolution $a_{LW}$ and can be supplied to the rule decoder RDEC, and $n_E$ values ME of the affiliation functions of the linguistic values of the input variables having the resolution $a_{ZF}$ are generated and supplied to the rule evaluation circuit RA. The rule decoder RDEC forms signals SM for reporting the input variables affected by a selected rule, whereby one signal per input variable, i.e. a total of $n_E$ bit-significant signals SM are advantageously present and numbers NA of the linguistic values of the output variables, whereby one signal for every linguistic value, i.e. a total of $n_{LW}$ bit-significant signals are advantageously provided. The signals SM and the signals NA are conducted to the inputs of the rule evaluation circuit RA. Using a rule evaluation clock signal CRA from the rule unit CTRL and dependent on an externally supplied operation select signal MODE0, weighting signals G each respectively having the resolution $a_{ZF}$ of the affiliation functions of the input variables can be generated in the rule evaluation circuit RA for the $n_{LW}$ linguistic values of the output values and can be supplied to the inference circuit INF. The memory SAV of the inference circuit INF can be addressed by a $a_A$ bit wide addressing signal P from the rule circuit CTRL, whereby $a_A$ represents the resolution of the distinct output value A. Triggered by an inference start signal STAI and dependent on an externally suppliable inference select signal MODE1, a nondistinct unification set FA having the resolution $a_{ZF}$ of the affiliation functions of the linguistic values of the output variables can be formed in the inference circuit and can be supplied to the defuzzification circuit DFUZ. Using an inference clock signal CIF and of an inference stop signal STI1 from the rule unit CTRL, a distinct output signal A having the resolution $a_A$ bits and a signal OV for confirmation of a valid output signal (output valid) are generated in the defuzzification circuit DFUZ from the unification set FA dependent on an externally suppliable defuzzification select signal MODE2. The sequencer CTRL can be supplied or driven by a clock signal CLK that, for example, is externally supplied and the signal IV for confirmation of valid input data.

Figure 2:
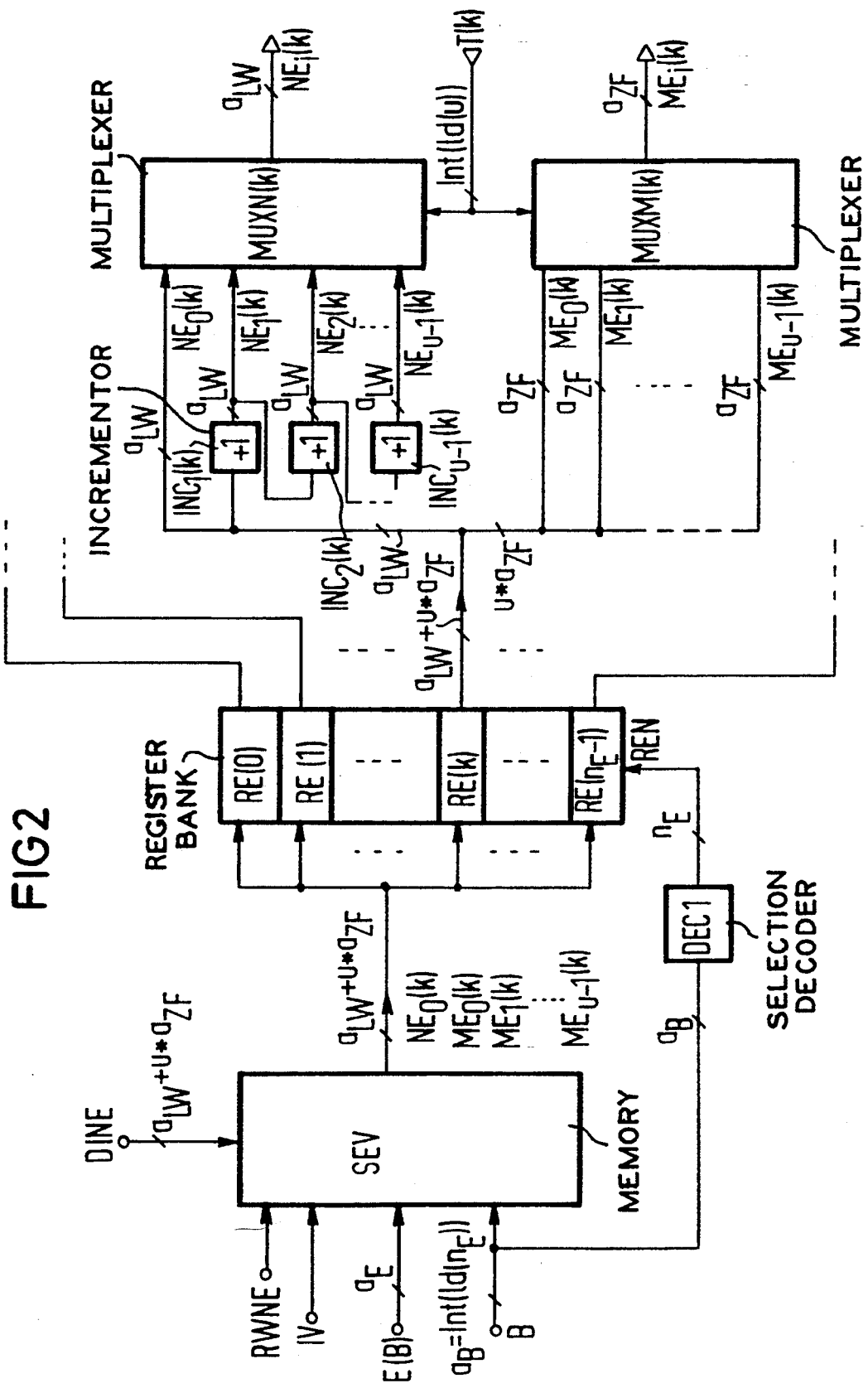
FIG. 2 is a detailed circuit diagram of the fuzzification circuit of FIG. 1.

The fuzzification circuit FUZ shown in FIG. 1 is constructed, for example, in conformity with FIG. 2 and has a memory SEV for storing the input variables, a selection decoder DEC1, a register bank composed of the registers RE(0) ... RE($n_E-1$) as well as (shown by way of example for an $k^{th}$ input variable) a $k^{th}$ number multiplexer MUXN (k), a $k^{th}$ value multiplexer MUXM (k) and $u-1$ $k^{th}$ incrementors INC$_1$(k) ... INC$_{u-1}$(k). Distinct input values E(B) having the resolution $a_E$ are supplied to the memory SEV as address signals in addition to block selection signals B having the resolution $a_B=$Int (ld($n_E$)), whereby the distinct input values E(B) are chronologically serially received for every input variable and a separate memory block B is provided for every input variable. The memory SEV can be executed as a read-only memory (for example, ROM) or as a random-access memory (for example, RAM) and has the capacity $K_E=n_E * 2^{(a}E) * (a_{LW}+u * a_{ZF})$. The memory SEV is organized such that respectively $a_{LW}+u *$ $a_{ZF}$ bits can be read out in parallel or can be written in parallel by a data inputs DINE in the case of a random-access memory. In addition to being supplied with the signal IV (input valid), the memory SEV also has an externally supplied write/read select signal RWNE made available to it insofar as the memory SEV is a random-access memory. Using the memory SEV, a lowest number NE$_0$ (k) of all $u-1$ possible numbers NE$_i$ (k) of the respectively affected linguistic values of the input variables and values ME$_0$ (k) ... ME$_{u-1}$ (K) of the affiliation functions of the maximum of u simultaneously affected linguistic values of the input variables are allocated to a specific, distinct value E(B) of a $k^{th}$ input variable at the output of the memory SEV and are supplied to the $n_E$ registers of the register bank. The $a_B = \text{Int}(\text{ld}(n_E))$ bit wide block select signal B is conducted via the selection decoder DEC1 onto $n_E$ activation inputs REN of the registers RE(0) ... RE($n_E-1$). What can thereby be achieved is that the appertaining blocks of the memory SEV for all input variables are stored in the corresponding registers of the register bank, so that they are simultaneously available in parallel for the number and value multiplexers. The values $ME_0(k)$ ... $ME_{u-1}(k)$ stored, for example, in the register RE (k) are thereby supplied, for example, to the value multiplexer MUXM (k) and the numbers $NE_0(k)$ ... $NE_{u-1}(k)$ are generated step-by-step from the lowest number $NE_0(k)$ using the incrementors $INC_1(k)$ ... $INC_{u-1}(k)$ and are supplied to the number multiplexer MUXN (k). The incrementors have a width of $a_{LW}$ bits and are of such a nature that the input signal incremented by 1 is present at their output insofar as the input signal is less than $2^{(a_{LW})}-1$ and zero is present at their output insofar as the input signal is $2^{(a_{LW})}-1$. One of the maximum of u numbers $NE_i(a)$ of the linguistic values of the $k^{th}$ input value together with the appertaining value of the affiliation function of the linguistic value can be selected by the $k^{th}$ fuzzification control signal T (k) having the bit width Int (ld(u)) with the number $NE_i(k)$ of the $k^{th}$ input variable. The other registers of the register bank are also correspondingly followed by number multiplexers and value multiplexers that are likewise selected by fuzzification rule signals from the sequencer CTRL, whereby the fuzzification control signals T are $n_E \ast$ Int (ld(u)) bits wide over all. The fuzzification control signals T are of such a nature that all $u^n E$ possible combinations of the numbers $NE_i$ (k) and appertaining values $ME_i(k)$ with i=0, 1, ..., u−1 and k=0,1, ..., $n_E-1$ are formed and can be through-connected to the rule decoder RDEC or to the rule evaluation circuit RA.

The rule decoder RDEC contains the linguistic protocol or the rule set of the fuzzy logic controller of the present invention. A rule thereby has the following form:

IF a first input variable has a specific linguistic value of the first input variables and a second input variable has a specific linguistic value of the second input variables and ... a $L^{th}$ input variable has a linguistic value of the $L^{th}$ input variables, THEN the output variable receives a specific linguistic value of the output variables.

All input variables thereby need not always be commendatorily operated; this means that, L can also be smaller than $n_E$. Since a maximum of $n_E$ input variables are commendatorily operated in the condition of a rule and every input variable comprises $n_{LW} = 2^{(a_{LW})}$ linguistic values, the rule decoder RDEC has $n_E \ast a_{LW}$ inputs. A maximum of $2^{(n_E \ast a_{LW})}$ combinations and, thus, rules are thus possible; in a realistic case of $a_{LW}=3$ and $n_E=8$, however, this means a total number of $2^{24}=16$ M possible rules. In practice, however, only a maximum of approximately 100 rules are required. The rule decoder is therefore not implemented as a memory for all possible rules but as a programmable logic circuit having standard architecture, for example as a PLA or FPGA. All combinations of numbers $NE_i(0 ... n_E-1)$ of the affiliation functions of the input variables are successively applied to the inputs of the rule decoder in $u^n E$ clock cycles generated by the sequencer CTRL. When a respectively present combination of numbers $NE_i(0 ... n_E-1)$ satisfies the condition of one of the rules, a logical one appears at that output of the $n_{LW} = 2^{(a_{LW})}$ outputs for the $n_{LW}$ numbers for the linguistic values of the output variables whose linguistic value arises as a consequence of the rule. Since the plurality of input variables combined with one another in a rule is generally less than or equal to $n_E$, the rule decoder RDEC in the illustrated embodiment of the invention supplies $n_E$ selection signals SM for the definition of the input variable affected by a respective rule, whereby a status bit that, for example, contains a logical 1 insofar as the appertaining input variable occurs in the rule is provided for each of the input variables. Care must be exercised in the formulation of the rules that the linguistic protocol is complete in the sense that all combinations of distinct input values E of the $n_E$ input variables are covered by rules and respectively yield a linguistic value of the output variables. The above-defined completeness of the rule set can also be satisfied with relatively few rules since, for example, differentiated rule conditions are only necessary in the proximity of the rated values of parameters of the system to be controlled or only the extreme value of a single linguistic variable plays a part for large deviations and since, moreover, there is the possibility that specific combinations of linguistic values of the input variables cannot occur at all for physical reasons.

Figure 3:
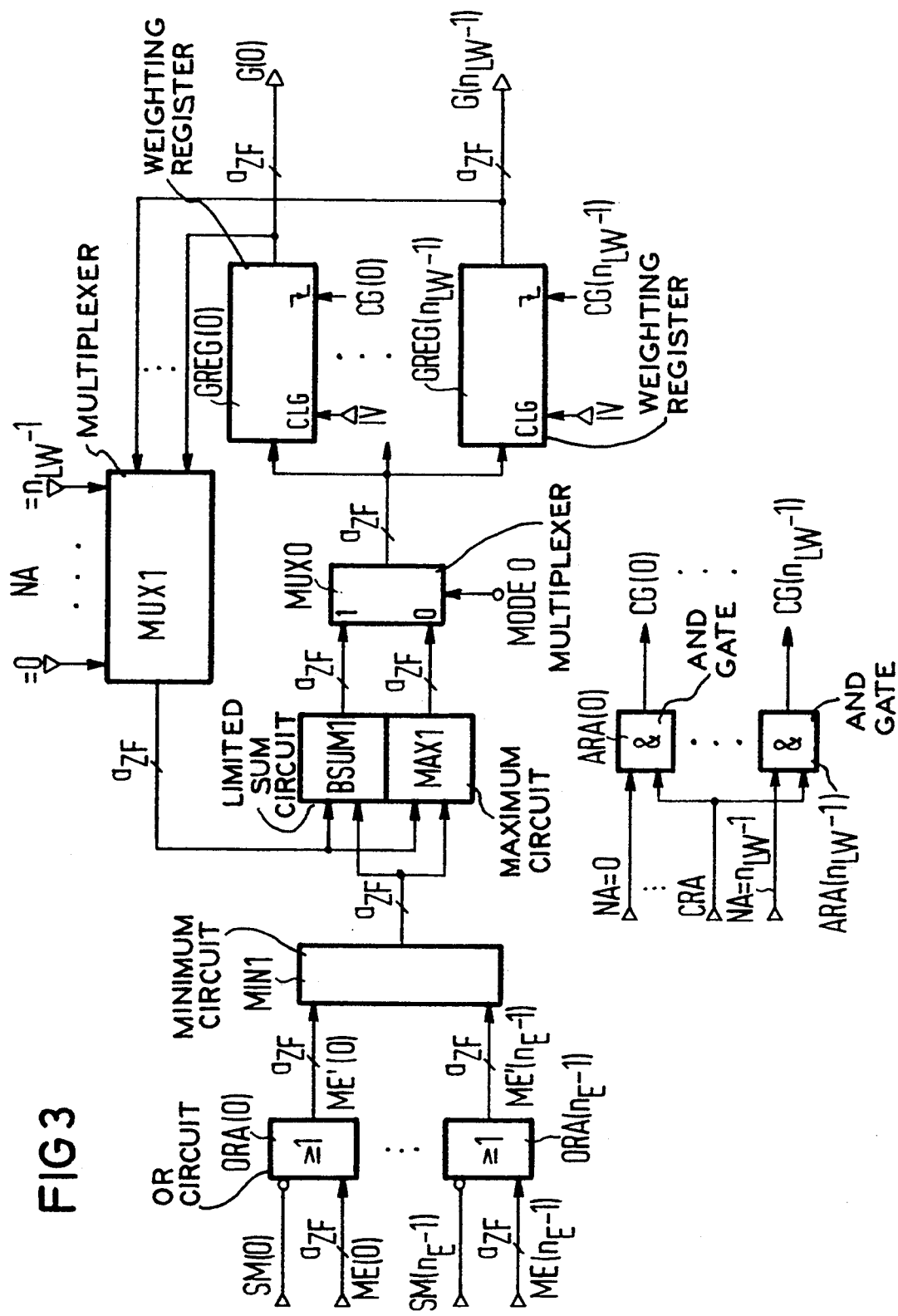
FIG. 3 is a detailed circuit diagram of the control or rule evaluation circuit of FIG. 1.

A rule evaluation circuit RA of the present invention for calculating the $n_{LW}$ weighting signals G that are $a_{ZF}$ bits wide is shown in FIG. 3. The rule evaluation circuit RA of the present invention is composed of $n_E$ OR circuits ORA (0) ... ORA ($n_E-1$), of a minimum circuit MIN1, of a circuit BSUM1 for the formation of a limited sum, of a maximum circuit MAX1, of a 1-of-2 multiplexer MUX0, of a $a_z$ 1 of $n_{LW}$ multiplexer MUX1, of $n_{LW}$ weighting registers GREG (0) ... GREG ($n_{LW}-1$) and $n_{LW}$ AND gates ARA (0) ... ARA ($n_{LW}-1$). The OR circuits ORA (0) ... ORA ($n_E-1$) receive a plurality of signals SM (0) ... SM ($n_E-1$). For the selection of the input variables occurring in a rule, the signals SM(0) ... SM($n_E-1$) are combined with the values ME (0) ... ME ($n_E-1$) of the affiliation functions of the respective input variables, whereby the selection signals SM are supplied to the OR circuits in inverted form. An OR circuit, for example, the OR circuit ORA (0) is composed, for example, of $a_{ZF}$ dual OR gates and is wired such that all bits of the output signal ME' (0) of the OR circuit ORA (0) receive a logical 1 when the significant bit SM (0) for the first input variable is equal to zero. That is, the first input variable does not occur in the current rule. When SM equals 1, the output signal ME' (0) is equal to the values ME (0) of the affiliation function of the first input variable. The analogous case is also valid for the other OR circuits ORA (1) ... ORA ($n_E-1$). The output signals ME' (0) ... ME' ($n_E-1$) are operated with one another in the minimum circuit MIN1. When one forgoes a variable rule format, then the signals SM and the OR circuits ORA (0) .... ORA ($n_E-1$) are not required since the values of the affiliation functions of the linguistic values of the input variables affected by all rules can be directly operated in the minimum circuit MIN1. The formation of the minimum corresponds to a nondistinct AND operation of the individual conditions in the conditional part (IF part) of a rule of the linguistic protocol. When an input variable thereby does not occur in the appertaining rule, then the output signal of the respective OR operation will exhibit the maximum value and will not be taken into consideration by the minimum circuit MIN1. The output signal of the minimum circuit MIN1 is simultaneously supplied both to the circuit BSUM1 for the formation of a limited sum as well as to the maximum circuit MAX1 and the $a_{ZF}$ bit wide output of the circuit BSUM1 is connected to a first input of the multiplexer MAX1 and the $a_{ZF}$ bit wide output of the maximum circuit MUX0 is connected to a further input of the multiplexer MUX0. When the externally suppliable operation select signal MODE0 is equal to zero, then the output signal of the maximum circuit MAX1 is connected to the inputs of the weighting registers GREG (0) ... GREG ($n_{LW}-1$), and, in the other case when the operation select signal MODE0 is equal to one, the output signal of the circuit BSUM1 is connected onto the inputs of the weighting registers. The circuit BSUM1 generates the sum of two input signals at its output insofar as it can be presented with $a_{ZF}$ bits and assumes the value maximally presentable with $a_{ZF}$ bits insofar as an overflow would occur. The weighting registers GREG (0) .... GREG ($n_{LW}-1$) are each respectively $a_{ZF}$ bits wide, have cancel inputs CLG that effect a cancellation of the respective weighting register as a consequence of a positive edge of the signal IV, and have clock inputs CG (0) ... CG ($n_{LW}-1$) that, triggered by a negative edge, store the input signals of the weighting registers and make them available at their outputs as weighting signals G (0) ... G ($n_{LW}-1$) that are respectively $a_{ZF}$ bits wide. From a clock CRA for the rule evaluation formed in the sequencer CTRL, clock signals CG (0) .... CG ($n_{LW}-1$) for the weighting registers are formed by the AND circuits ARA (0) ... ARA ($n_{LW}-1$) such that the signal for the number of the first linguistic value of the output variable (NA=0) is operated with the clock signal CRA to form the clock signal CG (0) and all other signals up to the number NA=$n_{LW}-1$ are correspondingly operated. Dependent on the respective number NA of the linguistic value of the output variable, the corresponding $a_{ZF}$ bit wide outputs of the weighting registers can be through-connected with the multiplexer MUX1 onto both the second input of the circuit BSUM1 for the formation of a limited sum and the second input of the maximum circuit MAX1. Since, generally, a plurality of rules have an identical linguistic value of the output variables, the appertaining condition parts of the rules, i.e. the output signal of the minimum circuit MIN1, must be operated by a nondistinct OR circuit. Inventively dependent on the operation select signal MODE0, the maximum circuit MAX1 or the circuit BSUM1 for the formation of a limited sum can be alternatively used as a nondistinct OR circuit. The weighting signals G (0) ... G ($n_{LW}-1$) practically represent the respective limiting level for the affiliation functions of the linguistic values of the output variables. What is important for the high operating speed is that the weighting signals are defined only once for every set of distinct input values E (0 ... $n_E-1$) and are not respectively newly defined for $u^n$E combinations.

FIG. 4 shows a more detailed circuit structure of an inference circuit INF of the present invention for a maximum overlap degree of u=2 that is composed of a 1-of-2 multiplexer MUX2, a multiplexer MUX3, a further 1-of-2 multiplexer MUX4, u=2 minimum circuits MIN2 and MIN3, a circuit BSUM2 for the formation of a limited sum, a maximum circuit MAX2 and the memory SAV for the output variables. The memory SAV is thereby similarly optimized like the memory SEV for the input variables, i.e. the lowest numbers $NA_0$ for the linguistic values of the output variables having a resolution of $a_{LW}$ bits and respectively u values $MA_0 \ldots MA_{u-1}$ having a resolution of $a_{ZF}$ bits are stored per address, whereby the maximum overlap degree u for the input variables and for the output variables can generally be different. Insofar as $n_A$ output variables are provided the memory SAV has the capacity $K_A = n_a * 2^{(a_A)} * (a_{LW}+u * a_{ZF})$, whereby $a_{LW}+u * a_{ZF}$ bit wide words can be addressed. The memory SAV can likewise be implemented as a read-only memory or as a random-access memory. Insofar as the memory SAV, as shown in FIG. 4, is fashioned as a random-access memory and insofar as an externally suppliable write-read signal RWNA is equal to zero, $a_A$ bit wide addresses ADR externally suppliable via the multiplexer MUX2 can be through-connected onto the address inputs of the memory SAV and an externally suppliable acceptance signal CEA can be through-connected onto input IVA for the confirmation of valid input data at the memory SAV and externally suppliable data input signals DINA can be supplied to the memory. When the write-read signal RWNA is equal to one, then addressing signals P generated in the sequencer CTRL are connected via the multiplexer MUX2 onto the address inputs of the memory SAV and an inference start signal STAI likewise generated in the sequencer CTRL is connected onto the input IVA for the confirmation of valid input signals of the memory SAV. In the read mode, i.e. for RWNA equal to 1, the addressing signal P selects an element s of the total of $2^{(a_A)}-1$ elements of the area of distinct values of the output variables and the lowest number $NA_0|_s$ of the linguistic value of the output variables can be read out for the element or, respectively, at this location and, for u=2, the values $MA_0|_s$ and $MA_1|_s$ of the two overlapping affiliation functions of the output variables can be read out at the location s. By means of the multiplexer MUX3 and dependent on the signals read out from the memory SAV for the numbers $NA_0|_s$, the maximally u weighting signals $G_0|_s$ and $G_1|_s$ at the location s are selected from the weighting signals G (0) ... G ($n_{LW}-1$). A value table for the multiplexer MUX3 for u=2 and $n_{LW}=8$ is depicted in FIG. 4A, whereby the weighting signal $G_x = G((NA_0)_{decimal} + x)$ is valid for $(NA_0)_{decimal}+x$ less than $n_{LW}$, otherwise G has the value 0. Theoretically, a maximum overlap degree of u equal to $n_{LW}$ is possible. The value $MA_0|_s$ and the weighting signal $G_0|_s$ are nondistinctly AND operated in the minimum circuit MIN2 and the value $MA_1|_s$ is nondistinctly AND operated with the weighting signal $G_1|_s$ in the minimum circuit MIN3, i.e. the respective affiliation function is limited to the level of the value defined by the respective weighting signal. The output signal of the minimum circuit MIN2 and the output signal of the minimum circuit MIN3 is then nondistinctly OR operated both in the maximum circuit MAX2 as well as in the circuit BSUM2 for the formation of a limited sum. Dependent on an externally suppliable inference select signal MODE1, either the output of the maximum circuit MAX2 or the output of the circuit BSUM2 can be through-connected by the multiplexer MUX4 onto an output for a nondistinct unification set FA (s).

FIG. 5 shows a detailed circuit of an inventive defuzzification circuit DFUZ, whereby an $a_{ZF}$ bit wide signal for the nondistinct unification set FA (s) is supplied both to a sum formation circuit COG for the center of gravity calculation as well as to a sum formation circuit MOM for the calculation of a mean of maxima. The circuit COG thereby supplies an $a_A+a_{ZF}$ bit wide first sum S0' and a second sum S1' having the width 2 * $a_A + a_{ZF} - 1$ bits. The circuit MOM generates an $a_A + 1$ bit wide sum S0'' and a sum S1'' having the width 2 * $a_A - 1$ bits. By means of a multiplexer MUX5 and dependent on a defuzzification select signal MODE2, either the sums S0' and S1' of the circuit COG or the sums S0'' and S1'' of the circuit MOM can be connected in the form of a 2 * $a_A + a_{ZF} - 1$ bit wide intermediate sum S1$|_{s+1}$ and of an intermediate sum S0$|_{s+1}$ having a bit width of $a_A + a_{ZF}$ onto the two inputs of a divider DIV at whose output the distinct value A of the output variables can be formed. In the formation of the distinct value of the output variables, one begins with the location $s = 2\, a_A - 1$ and a processing of the distinct unification set FA (s) is continued up to $s = 0$. In order to be able to use this divider DIV both for the sums S0' and S1' as well as for the sums S0'' and S1'', the leading $a_{ZF}$ bits in the sum S1'' and the leading $a_{ZF} - 1$ bits in the sum S0' are zeros.

A sequencer CTRL of an inventive fuzzy logic controller for generating the fuzzification control signals T, the rule evaluation clock CRA, the inference start signal STAI, the addressing signals P, the inference clock signal CIF and the inference stop signal STI1 from the clock signal CLK and the signal IV for confirmation of valid input data is shown in FIG. 6. The sequencer CTRL has an $n_E *$ Int (ld (u)) bit wide forward counter VZ, an $a_A$ bit wide backward counter RZ, inverter circuits I1 ... I7, delay circuits V1 ... V4 having a delay time $t_v$, AND circuits A1 ... A10, RS flip-flops FF1, FF3, FF4 and FF6, D-flip-flops FF2, FF5 and a NOR circuit 01. The clock signal CLK is connected to the input of the inverter I1, to the input of the delay circuit V1, to the input of the inverter I4 and to the input of the delay circuit V3. The signal IV for the confirmation of valid input data is connected to the input of the inverter I2, the reset input of the flip-flop FF1, the cancel input of the flip-flop FF2, the cancel input of the forward counter VZ, the cancel input of the flip-flop FF5 and the cancel input CLEAR of the backward counter RZ. The output of the inverter I1 and the output of the delay circuit V1 form the inputs of the AND circuit A1 whose output forms an input of the AND circuit A2. The output signal of the inverter I2 is supplied to a second input of the AND circuit A2 and the signal of the inverted output QN of the flip-flop FF1 is fed back to a third input of the AND circuit A2. The RS flip-flop FF1 has its setting input S wired with the output of the AND circuit A2 and its output Q supplies a rule evaluation start signal STAR for an input of the AND circuit A4. The AND circuit A4 has a further input that is connected to the output of the inverter I1 and whose output supplies the clock signal CRA for the rule evaluation circuit RA. The clock signal CRA serves as input signal for the forward counter VZ that supplies the control signals T for the fuzzification circuit FUZ at its $n_e *$ Int (ld(u)) parallel outputs and whose signals are operated by the AND circuit A5 in order to supply a one signal for the data input D of the flip-flop FF2 given the appearance of the highest value that can be represented in the forward counter VZ. Over and above this, the clock CRA is supplied to the clock input of the flip-flop FF2, to the delay circuit V2 and to the inverter circuit I2. The output Q of the flip-flop FF2 carries an unsynchronized rule evaluation signal STOR and is connected via an inverter I3 to the reset input R of the flip-flop FF3 whose output Q forms a rule evaluation stop signal STR1 and is supplied both to the cancel input CLEAR of the flip-flop FF1 as well as to an input of the AND circuit A8. The signal at the setting input of the flip-flop FF3 is formed at the output of the AND circuit A6 whose first input is connected to the Q output of the flip-flop FF2, whose second input is connected to the output of the delay circuit V2, whose third input is connected to the output of the inverter I2 and whose fourth input is connected to a feed back of the negated output QN of the flip-flop FF3. The output signals of the inverter I4 and of the delay circuit V3 are operated by the AND circuit A7 which has its output side connected to an input of the AND circuit AS. The setting input S of the flip-flop FF4 is driven with the output of the AND circuit A8 and the reset input R of this flip-flop is driven via the inverter I5 by the rule evaluation stop signal STR1. The inference start signal STA1 for the inference circuit INF that is simultaneously supplied to an input of the AND circuit AN is provided at the output Q of the flip-flop FF4. The negated output QN of the flip-flop FF4 is fed back onto an input of the AND circuit A8. The AND circuit A9 has a further input that is connected to the output of the inverter circuit I4 and has an output that supplies the inference clock signal CIF for the defuzzification circuit DFUZ. The inference clock signal CIF is supplied to the input of the backward counter RZ, to the clock input of the flip-flop FF5, to the input of the delay circuit V4 and to the input of the inverter I7. The backward counter RZ supplies the addressing signals P for the inference circuit INF at its $a_A$ parallel outputs. The addressing signals P are operated by the NOR circuit 01, as a result whereof a one signal can be supplied to the data input D of the flip-flop FF5 given the appearance of the minimum value of the backward counter RZ. The reset input R of the flip-flop FF6 is connected via the inverter I6 to the output Q of the flip-flop FF5 that carries an unsynchronized inference stop signal STOI. The setting input S of the flip-flop FF6 is wired to the output of the AND circuit A10 whose first input is connected to the output Q of the flip-flop FF5, whose second input is connected to the output of the delay circuit V4, whose third input is connected to the output of the inverter I7 and whose fourth input is connected to a feed back of the negated output QN of the flip-flop FF6. The output Q of the flip-flop FF6 supplies the inference stop signal STI1 that is supplied to the cancel inputs CLEAR of the flip-flop FF4 and to the defuzzification circuit DFUZ.

Since a negative edge has occurred at the signal IV for confirmation of valid input data, the start signal STAR is set from 0 to 1 with the following negative edge of the clock signal CLK, as a result whereof the clock signal CLK can be supplied in inverted form as rule evaluation clock signal CRA to the rule evaluation circuit RA as long as the start signal STAR is at one. The forward counter VZ cleared with the leading edge of the signal IV is now counted up by the rule evaluation clock signal CRA up to the maximum value, i.e. until all power outputs carry a one and, thus, all $u^nE$ possible combinations of affiliation functions of the input variables have been generated. When the maximum value is reached at the forward counter VZ, then all weighting signals G (0 ... $n_{LW} - 1$) are available in valid form and the start signal STAR is in turn reset from 1 to 0, as a result whereof the rule evaluation clock signal CRA no longer receives the inverted clock signal CLK but is constantly zero. The clock signal STR1 is now set from 0 to 1, as a result whereof the inference start signal STA1 receives a one signal with the next negative edge of the clock signal CLK and the clock signal CLK is forwarded to the defuzzification circuit DFUZ in inverted form as inference clock signal CIF. Simultaneously, the backward counter RZ set to the maximum value by the signal IV is counted down by the inference clock signal CIF to the minimum value, i.e. all $a_A$ parallel outputs are at zero. A backward-counting addressing and processing of $s=2^{(a_A)}-1$ through $s=0$ leads to an especially advantageous possible realization of the sum forming circuit COG for the center of gravity calculation. When the minimum value $s=0$ is reached, the inference start signal is reset to zero with the negative edge of the inference clock signal CIF and the inference stop signal STI1 is set from 0 to 1 as a result whereof the inference clock signal CIF receives a permanently zero signal and the backward counter is stopped. What the sequencer CTRL effects among other things is that, while a respective signal FA (s) for the nondistinct unification set for a location s of the area of distinct values of the output variables is calculated in the inference circuit INF, nondistinct unification sets FA (m) for locations $m=s+1\ldots, 2^{(a_A)}-1$ that have already been calculated in the area of distinct values of the output variables are simultaneously further-processed in the defuzzification circuit DFUZ. This, however, can also occur successively.

As shown in FIG. 7, the sum forming circuit COG can, for example, be composed of a series circuit of two integrators. The first integrator has an adder means ADD0 and a sum register SOREG and the second integrator has an adder means ADD1 and a sum register S1REG. The unification set FA (s) at the location s can be supplied with a bit width of $a_{ZF}$ to the first adder means ADD0 and the $a^a+a_{ZF}$ bit wide output is connected to a correspondingly wide input of the sum register SOREG and an $a_A+a_{ZF}$ bit wide intermediate sum $SO'|_{s+1}$ is available at the output of the sum register SOREG as possible devisor for the divider DIV and as recursion value for the adder means ADD0. The intermediate sum $SO'|_{s+1}$ is likewise supplied to the adder means ADD1 of the second integrator whose $2 * a_A + a_{ZF} - 1$ bit wide output is connected to a sum register S1REG having the same width, whereby the sum register S1REG supplies a second intermediate sum $S1'|_{s+1}$ at its $2 * a_A + a_{ZF} - 1$ bit wide output as possible dividend for the divider DIV and as recursion value for the adder unit ADD1. The registers can be cleared by the signal IV for the confirmation of valid input data and are clocked by means of the inference clock signal CIF, since the defuzzification here is inventively simultaneously implemented with the inference formation. Since the processing begins with the maximum value $s=2^{(a_A)}-1$ and this value is contained again in the intermediate sum $S1'|_{s+1}$ at every addition step in the adder means ADD1, a weighting with the factor s ensues. The next lower value $s=2^{(a_A)}-2$ occurs one less time in the intermediate sum and is therefore only weighted with the factor $s-1$, etc.

Figure 8:
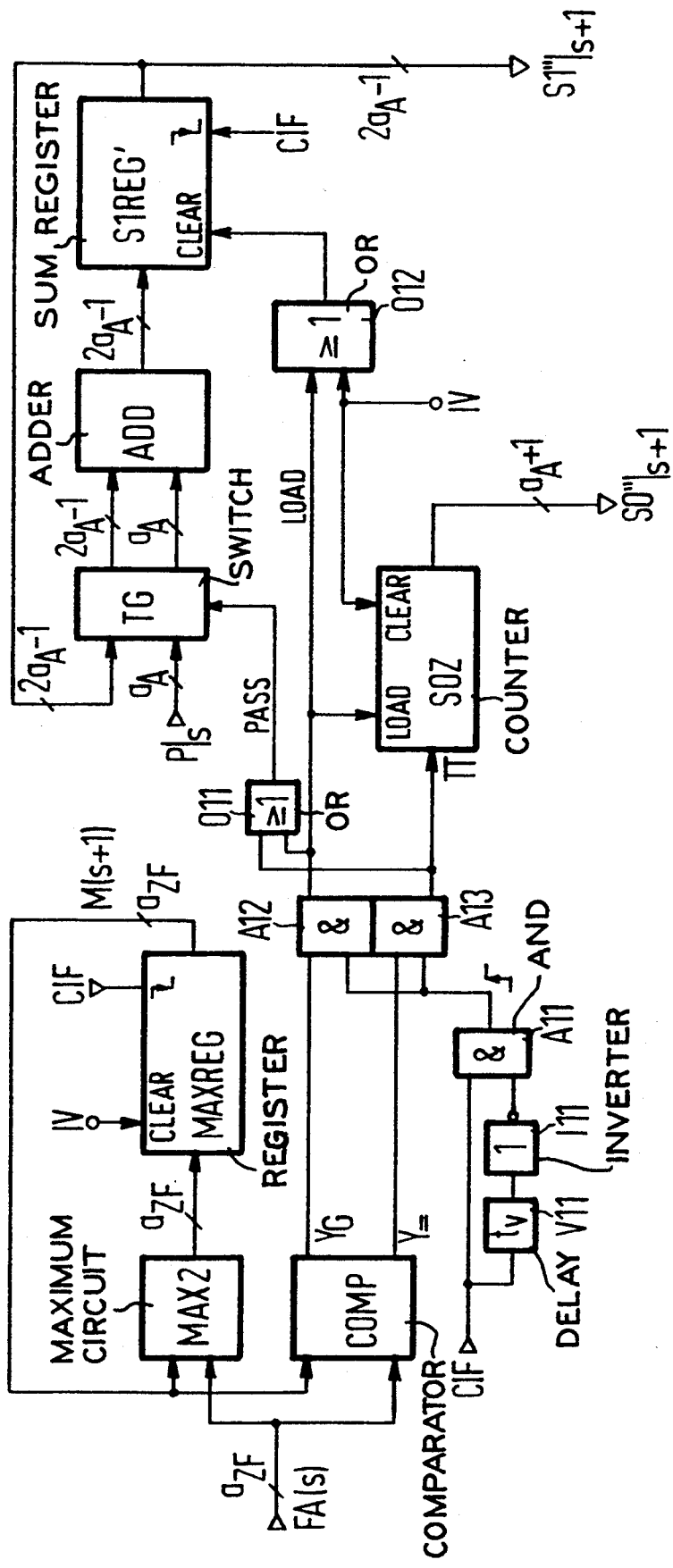
FIG. 8 is a further detailed circuit diagram related to the defuzzification circuit of FIG. 5.

FIG. 8 shows an advantageous embodiment of the sum forming circuit MOM for the calculation of a mean of maxima that has a maximum circuit MAX2 for the comparison of two $a_{ZF}$ bit wide signals, a register MAXREG for storing the previous maximum M (s+1), a greater than/equal to comparator COMP, an electronic switch unit TG, for example in the form of a transfer gate, an adder means ADD having the bit width $2 * a_A - 1$, a sum register S1REG', a counter SOZ for counting equal maximum values, a delay circuit V11, an inverter circuit I11, AND circuits A11...A13 and OR circuits O11, O12. The unification set FA (s) can thereby be supplied both to an input of the maximum circuit MAX2 and to an input of the comparator circuit COMP. The further input of the maximum circuit and of the comparator circuit is respectively connected to the output of the register MAXREG. The input of the register MAXREG is wired to the output of the maximum circuit MAX2. The signal IV for confirmation of valid input data can be supplied to the cancel input CLEAR and the interference clock signal CIF can be supplied to the clock input, as a result whereof the current maximum is written into the maximum register by the negative edge of the signal CIF after every step for the respective location s. The inference clock signal CIF is directly supplied to the AND circuit A11 and is supplied to the inverter I11 via the delay circuit V11 having the delay time $t_v$, as a result whereof pulses having the width $t_v$ can be formed at the output of the AND circuit A11 triggered by the respective, positive edges of the signal CIF and these pulses can be respectively supplied to an input of the AND circuit A12 and A13. A greater than output signal $Y_G$ can be supplied to the second output of the AND circuit A12 and an output signal $Y_=$ can be supplied to the second input of the AND circuit A13. The output of the AND circuit A12 is connected to a load input LOAD of the counter SOZ and to an input of the OR circuit O12 and the output of the AND circuit A13 supplies counting pulses TT for the counter SOZ. The counter SOZ has a cancel input CLEAR that, in common with a second input of the OR circuit O12, receives the signal IV for the confirmation of valid input signals and at whose $a_A+1$ bit wide output a further, first intermediate sum $SO''|_{s+1}$ is available as possible divisor for the divider DIV. The register S1REG' has its input side wired to the $2 * a_A - 1$ bit wide output of the adder ADD, has a cancel input CLEAR that is connected to the output of the OR circuit O12, comprises a clock input to which the inference clock signal CIF can be supplied and has a $2 * a_A - 1$ bit wide output that supplies a further, second intermediate sum $S1''|_{s+1}$ as possible dividend for the divider DIV and that can be supplied to an input of the circuit TG ADD. The output signals of the AND circuits A12 and A13 are operated by the OR circuit O11 and form a through-connect signal DASS for driving the electronic switch unit TG that through-connects the addressing signals $P|_s$ for the location s as well as $S1''|_{s+1}$ onto the two inputs onto the adder means ADD for PASS equal to one. When the nondistinct unification set FA (s) is equal to the previous maximum M (s+1), the new intermediate sum $SO''|_s$ derives from the previous intermediate sum $SO''|_{s+1}+1$ and the new second intermediate $S1''|_s$ derives from the previous intermediate sum $S1''|_{s+1}+P|_s$. The result of this is that, given a plurality of maximum values of equal size, these values are summed up and are divided by the plurality of these values using the divider DIV and, thus, the mean of the maximum plateau is calculated. When the unification set FA (s) at the location s is greater than the previous maximum M (s+1), then the counter SOZ and, thus, the new intermediate sum $SO''|_s$ is set equal to 1. The new intermediate sum value $S1''|_s$, as in the first case derives, however the content of the register S1REG' was previously cleared and as a result the value $P|_s$ of the maximum derives for the new intermediate sum value $S1''|_s$. In the last case, wherein the unification set FA (s) is smaller than the previous maximum M (s+1), the new intermediate sums are respectively the previous intermediate sums.

Figure 9:
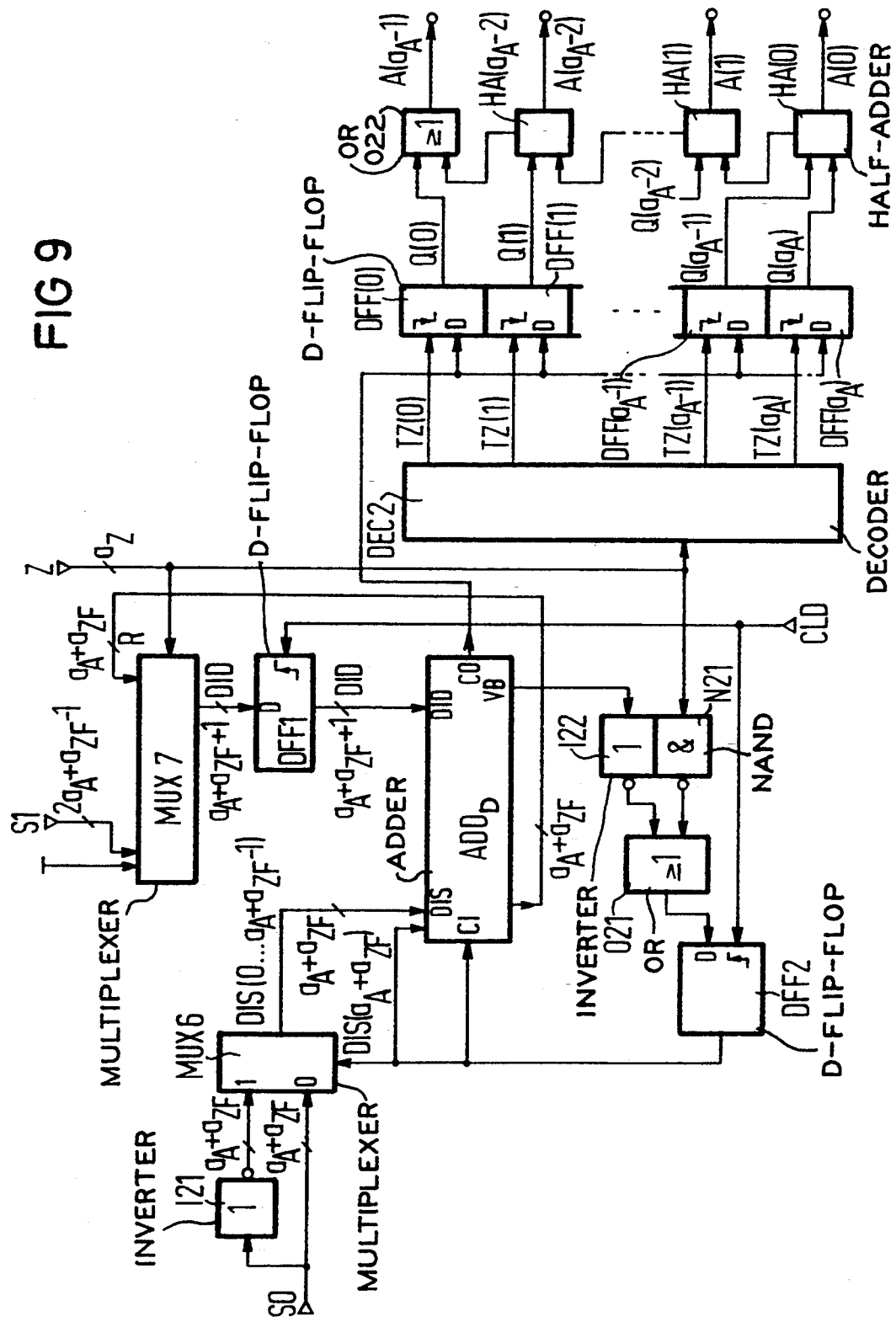
FIG. 9 is a detailed circuit diagram of a divider of the defuzzification circuit of FIG. 5.

A universally standard divider can be used as division circuit DIV in the defuzzification circuit DFUZ, this divider, for example, operating according to the "method without resetting the remainder" ("non-restoring" algorithm). Since, however, certain conditions are valid for the devisor and dividend, for example that the divisor is smaller than the dividend, that the divisor and the dividend are both positive and that the result comprises less than $a_A$ bits, the divider DIV can be somewhat simplified. FIG. 9 shows an exemplary embodiment of an advantageous divider having an adder unit $ADD_D$, an $a_A+a_{ZF}$ bit wide 1-of-2 multiplexer MUX6, an $a_A+a_{ZF}+1$ bit wide multiplexer MUX7, a decoder DEC2 that has an $a_z$ bit wide input and with which clock signals TZ (0) ... TZ ($a_A$) can be formed, having D-flip-flops DFF (0), DFF (1) .... DFF ($a_A$), half-adders HA (0) ... HA ($a_A-2$), OR circuits 021 and 022, an NAND circuit N21 having $a_z$ inputs, an $a_A+a_{ZF}$ bit wide inverter unit I21 and an inverter I22. The multiplexer MUX7 can be selected by an $a_Z$ bit wide counter signal Z and the following value table derives:

| Z (0..$a_z-1$) (decimal) | DID($a_A+a_{ZF}$) | DID($a_A+a_{ZF}-1$)....DID(1) | DID(0) |
|---|---|---|---|
| 0 | 0 | S1($2^*a_A+a_{ZF}-2$)...S1($a_A$) | S1($a_A-1$) |
| 1 | R($a_A+a_{ZF}-1$) | R($a_A+a_{ZF}-2$)   ...R(0) | S1($a_A-2$) |
| . | . | . .... . | . |
| . | . | . .... . | . |
| . | . | . .... . | . |
| $a_A-1$ | R($a_A+a_{ZF}-1$) | R($a_A+a_{ZF}-2$)   ...R(0) | S1(0) |
| $a_A$ | R($a_A+a_{ZF}-1$) | R($a_A+a_{ZF}-2$)   ...R(0) | 0 |

The decoder DEC2 is constructed such that a clock signal TZ (b) equal to 1 derives at an output when the counter signal is equal to $b_{dual}$ and is otherwise TZ (b) equal 0, whereby b=0, 1, ... $a_A$ applies. An input of the adder unit $ADD_D$ is wired to the output of the $a_A$-=$a_{ZF}+1$ bit wide output of the flip-flop DFF1, as a result whereof the dividend DID can be supplied to the adder circuit. The D-flip-flop DFF1 receives the output signals of the multiplexer MUX7 at its data input D and is clocked by a rising edge of a division clock signal CLD of a divider sequencer that shall be set forth in greater detail later. The $a_A+a_{ZF}$ bit wide intermediate sum SO is supplied to the further summation input of the adder $ADD_D$ directly insofar as the control signal of the multiplexer MUX6 is equal to zero and is supplied to the further summation input of the adder $ADD_D$ via the inverter unit I21 as divisor part DIS (0 ... $a_A+a_{ZF}-1$) insofar as the control signal of the multiplexer MUX6 is equal to one. The adder circuit $ADD_D$ has an $a_A+a_{ZF}$ bit wide output for the division remainder R that can be supplied to the multiplexer MUX7 at the input side and has an output VB for the operational sign bit that can be supplied via the inverter I22 to an input of the OR circuit 021. The counter signal is operated by the NAND circuit N21 and is supplied to the second input of the OR circuit 021. The output of the OR circuit 021 is connected to the data input D of the flip-flop circuit DFF2 whose clock input is wired with the divider clock signal CL2 and whose output is connected to a carry input CI of the adder unit $ADD_D$ that supplies the control signal for the multiplexer MUX6 and the MSBDIS ($a_A+a_{ZF6}$) of the divisor for the adder circuit $ADD_D$. The carry output CO of the adder circuit $ADD_D$ can be simultaneously supplied to the data inputs D of the D-flip-flops DFF (0) ... DFF ($a_A$) and the flip-flop DFF (0) is clocked by a negative edge of the clock signal TZ (0). The analogous case is valid for the other flip-flops up through the flip-flop DFF ($a_A$) that is clocked by the negative edge of the clock signal TZ ($a_A$). The outputs Q (0) ... Q ($a_A$) of the flip-flops DFF (0) ... DF ($a_A$) are conducted to an input of the OR circuit 022 and to the summation inputs of the half-adders HA (0) ... HA ($a_A-2$) and the carry output of the half-adder HA (0) is conducted in the second input of the half-adder HA (1), etc., until the carry output of the half-adder HA ($a_A-2$) supplies the signal for the second input of the OR circuit 022. The output signal of the OR circuit 022 thereby represents the MSBA ($a_A-1$) of the distinct value A of the output variable. The analogous case is valid for the outputs of the half-adders, whereby the LSB A (0) of the distinct value A of the output variable can be taken at the output of the half-adder HA (0).

FIG. 10 shows a sequencer for the divider shown in FIG. 9, this sequencer generating the divider clock signal CLD, the $a_z$ bit wide counter signal Z, and an externally available signal OV for the confirmation of valid output data from the clock signal CLK, the signal IV for valid input data and the inference stop signal STI1. The sequencer of FIG. 10 has a forward counter VZD with the bit width $a_z$=Int (1d($a_A+1$)), RS flip-flops FF7, FF8 and FF10, D-flip-flops FF9 and FF11, a stop circuit STOP, AND gates A31 ... A36, delay circuits V31 ... V33 having the delay time $t_v$ and inverters I31 ... I35. The clock signal CLK can be supplied via the inverter I31 to an input of the AND circuit A35, the input of the delay circuit V32 and to an input of the AND circuit A32, can be supplied via the delay circuit V31 to the second input of the AND circuit A32 and can be directly supplied both the second input of the AND circuit A31 as well as to the clock input of the flip-flop FF11. The output of the AND circuit A31 is connected to an input of the AND circuit A33 and the output of the AND circuit A32 is connected to an input of the AND circuit A34. The inference stop signal STI1 can be directly supplied to a further input of the AND circuit A33 and can be supplied to the reset input R of the flip-flop FF7 via the inverter I32. The output of the AND circuit A33 is connected to the setting input S of the flip-flop FF7 whose inverted output QN is fed back onto the third input of the AND circuit A33. A division start signal STAD is provided at the output Q of the flip-flop FF7 and is directly supplied to a further input of the AND circuit A34 and is supplied to the reset input R of the flip-flop FF8 via an inverter I33. The flip-flop FF8 has a setting input S that is wired to the output of the AND gate A34 and has an output Q that is wired to the second input of the AND circuit A35 and an inverting output QN that is wired to the third input of the AND circuit A34. The divider clock signal CLD pends at the output of the AND circuit A35, this being suppliable to the divider, to the counter input of the forward counter VZD, to the clock input of the flip-flop FF9, to the delay circuit V33 and to the inverter I34, whereby the flip-flops DFF1 and DFF2 in the divider respond to a positive edge, the flip-flop FF9 likewise responds to a positive edge and the forward counter VZD of the sequencer of the divider responds to a negative edge of the signal CLD. The externally suppliable signal IV for the confirmation of valid input data is connected to the cancel inputs CLEAR of the flip-flop FF11, FF9 and of the forward counter VZD. The forward counter VZD has an $a_{ZS}=\text{Int }(ld(a_A+1))$ bit wide output at which the counter signals Z for the divider circuit of FIG. 9 and for the stop circuit STOP can be taken. For a realistic example with $a_A=8$ or, respectively, $a_z=4$, the circuit STOP is composed of an OR gate having an inverting input for the MSP Z (3) of Z. The flip-flop FF9 has a data input D that is connected to the output of the stop circuit and has an output Q that carries a division stop signal STOD and supplies this via the inverter I35 to the reset input R of the flip-flop FF9. The AND circuit A36 has a first input that is wired to the output Q of the flip-flop FF9, a second input that is wired to the output of the delay circuit V33, a third input that is wired to the output of the inverter circuit I34 and a fourth input that is wired to the inverting input QN of the flip-flop FF10 and an output that is wired to the setting input S of the flip-flop FF10. A defuzzification stop signal STD1 that can be conducted to the data input D of the flip-flop FF11 and to the cancel input CLEAR of the flip-flop FF7 is provided at the output Q of the flip-flop FF10. The externally available signal OV for the confirmation of valid output data can be taken at the output Q of the flip-flop FF11. As soon as the inference stop signal STI1 is equal to 1, the division start signal STAD is set to 1 with the positive edge of the clock signal CLK and the divider clock CLD corresponds to the inverted clock CLK. When the stop condition of the circuit STOP is satisfied, the divider stop signal STOD is set equal to 1 with the positive edge of the divider clock CLD, the defuzzification stop signal STD1 is likewise to set 1 with the following, negative edge of the divider clock signal CLD and the divider start signal STAD is reset to 0. Following another positive edge of the clock signal CLK, the signal OV for the confirmation of valid output data is likewise set to 1 after the defuzzification stop signal STD1 has received a one signal.

The fuzzy logic controller of the present invention can be constructed as a distinct component or as a component part of a commercially available microcontroller. The memories CEV and SAV can thereby be realized on the chip of the microcontroller or can also be realized off-chip.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A fuzzy logic controller, said fuzzy logic controller receiving $n_E$ input variables and outputting $n_{LW}$ output variables, comprising:

fuzzification circuit means having a memory for storing membership functions of the input variables, said fuzzification circuit means generating $u^nE$ combinations of first numbers for linguistic values of input variables addressed by externally supplied distinct values of the $n_E$ input variables and values of membership functions of the linguistic values of the input variables addressed by the externally supplied distinct values of the $n_E$ input variables, whereby a maximum of u membership functions respectively overlap and, as a result thereof, a maximum of u linguistic values are simultaneously addressed by a distinct value of the input variables;

rule decoder means having a linguistic protocol and for forming, in conformity with the linguistic protocol stored therein, second numbers of linguistic values of the output variables from the $u^nE$ combinations of the first numbers, the linguistic protocol being IF/THEN rules and the $u^nE$ combinations of the first numbers being an IF part of said rules and the second members being a THEN part of said rules;

rule evaluation circuit means for generating a weighting signal for each of $n_{LW}$ linguistic values of the output variables from the second numbers of linguistic values of the output variables and from the values of the membership functions of respective linguistic values of the output variables by means of at least one circuit for the formation of a nondistinct operation;

inference circuit means having a memory and at least one further circuit for the formation of a nondistinct operation, and said inference circuit means forming signals for nondistinct unification sets at respective locations from the weighting signals for all locations of an area of distinct values of the output variables;

a defuzzification circuit means having at least one evaluation circuit, said defuzzification circuit means generating distinct, externally available values of the output variables from the signals for the nondistinct unification sets of all locations of the area of distinct values of the output variables; and sequencer means for effecting that, after the $u^nE$ combinations of first numbers, the weighting signals for the $n_{LW}$ linguistic values of the output variables are calculated once for every set of distinct values of the $n_E$ input variables, said weighting signals being used in the inference circuit for all locations of the area of distinct values of the output variables.

2. The fuzzy logic controller according to claim 1, wherein selection signals for definition of the input variables affected by a respective rule are additionally formed in the rule decoder means; and wherein said selection signals are supplied to the rule evaluation circuit means.

3. The fuzzy logic controller according to claim 1, wherein the sequencer means also effects that nondistinct unification sets for already calculated locations of the area of distinct values of the output variables are simultaneously further-processed while a respective signal for the nondistinct unification set for a location of the area of distinct values of the output variables is calculated in the inference circuit means.

4. The fuzzy logic controller according to claim 1, wherein the rule evaluation circuit means has circuit means for formation of a limited sum and maximum circuit means that serve as first and second circuits, respectively, for the formation of a nondistinct operation; and wherein, alternatively, one of the first and second circuits is used for the formation of the weighting signals dependent on an externally supplied rule evaluation select signal.

5. The fuzzy logic controller according to claim 1, wherein the inference circuit means has circuit means for the formation of a limited sum and a maximum circuit means that serve as first and second, further circuits for the formation of a nondistinct operation; and wherein, alternatively, one of the first and second circuits is used for the formation of the signals for the nondistinct unification set at respective locations dependent on an externally suppliable inference select signal.

6. The fuzzy logic controller according to claim 1, wherein the defuzzification circuit means has a circuit for calculation of a center of gravity and a circuit for calculation of a mean of maxima that serve as first and second evaluation circuits; and wherein, alternatively, one of the first and second evaluation circuits is used for the formation of the distinct values of the output variables dependent on an externally suppliable defuzzification select signal.

7. The fuzzy logic controller according to claim 1, wherein the rule decoder means is programmable logic.

8. The fuzzy logic controller according to claim 1, wherein at least one of the memory for the input variables and the memory for the output variables is a random-access memory.

9. The fuzzy logic controller according to claim 1, wherein the fuzzy logic controller together with its memory for the input variables and its memory for the output variables is a component part of a conventional microcontroller.

10. A fuzzy logic controller, said fuzzy logic controller receiving $n_E$ input variables and outputting $n_{LW}$ output variables, comprising:

fuzzification circuit means having a memory for storing membership functions of the input variables, said fuzzification circuit means generating $u^nE$ combinations of first numbers for linguistic values of input variables addressed by externally supplied distinct values of the $n_E$ input variables and values of membership functions of the linguistic values of the input variables addressed by the externally supplied distinct values of the $n_E$ input variables, whereby a maximum of u membership functions respectively overlap and, as a result thereof, a maximum of u linguistic values are simultaneously addressed by a distinct value of the input variables;

rule decoder means having a linquistic protocol and for forming, in conformity with the linguistic protocol stored therein, second numbers of linguistic values of the output variables from the $u^nE$ combinations of the first numbers, the linguistic protocol being IF/THEN rules and the $u^nE$ combinations of the first numbers being an IF part of said rules and the second members being a THEN part of said rules, said rule decoder means having means for forming selection signals for definition of the input variables affected by a respective rule;

rule evaluation circuit means for generating a weighting signal for each of $n_{LW}$ linguistic values of the output variables from the second numbers of linguistic values of the output variables and from the values of the membership functions of respective linguistic values of the output variables by means of at least one circuit for the formation of a nondistinct operation, said selection signals being supplied to the rule evaluation circuit means;

inference circuit means having a memory and at least one further circuit for the formation of a nondistinct operation, and said inference circuit means forming signals for nondistinct unification sets at respective locations from the weighting signals for all locations of an area of distinct values of the output variables;

a defuzzification circuit means having at least one evaluation circuit, said defuzzification circuit means generating distinct, externally available values of the output variables from the signals for the nondistinct unification sets of all locations of the area of distinct values of the output variables; and sequencer means for effecting that, after the $u^nE$ combinations of first numbers, the weighting signals for the $n_{LW}$ linguistic values of the output variables are calculated once for every set of distinct values of the $n_E$ input variables, said weighting signals being used in the inference circuit for all locations of the area of distinct values of the output variables, the sequencer means also effecting that nondistinct unification sets for already calculated locations of the area of distinct values of the output variables are simultaneously further-processed while a respective signal for the nondistinct unification set for a location of the area of distinct values of the output variables is calculated in the inference circuit means.

11. The fuzzy logic controller according to claim 10, wherein the rule evaluation circuit means has circuit means for formation of a limited sum and maximum circuit means that serve as first and second circuits, respectively, for the formation of a nondistinct operation; and wherein, alternatively, one of the first and second circuits is used for the formation of the weighting signals dependent on an externally supplied rule evaluation select signal.

12. The fuzzy logic controller according to claim 10, wherein the inference circuit means has circuit means for the formation of a limited sum and a maximum circuit means that serve as first and second, further circuits for the formation of a nondistinct operation; and wherein, alternatively, one of the first and second circuits is used for the formation of the signals for the nondistinct unification set at respective locations dependent on an externally suppliable inference select signal.

13. The fuzzy logic controller according to claim 10, wherein the defuzzification circuit means has a circuit for calculation of a center of gravity and a circuit for calculation of a mean of maxima that serve as first and second evaluation circuits; and wherein, alternatively, one of the first and second evaluation circuits is used for the formation of the distinct values of the output variables dependent on an externally suppliable defuzzification select signal.

14. The fuzzy logic controller according to claim 10, wherein the rule decoder means is programmable logic.

15. The fuzzy logic controller according to claim 10, wherein at least one of the memory for the input variables and the memory for the output variables is a random-access memory.

16. The fuzzy logic controller according to claim 10, wherein the fuzzy logic controller together with its memory for the input variables and its memory for the output variables is a component part of a conventional microcontroller.

17. A fuzzy logic controller, said fuzzy logic controller receiving $n_E$ input variables and outputting $n_{LW}$ output variables, comprising:
fuzzification circuit means having a memory for storing membership functions of the input variables, said fuzzification circuit means generating $u^nE$ combinations of first numbers for linguistic values of input variables addressed by externally supplied distinct values of the $n_E$ input variables and values of membership functions of the linguistic values of the input variables addressed by the externally supplied distinct values of the $n_E$ input variables, whereby a maximum of u membership functions respectively overlap and, as a result thereof, a maximum of u linguistic values are simultaneously addressed by a distinct value of the input variables;
rule decoder means having a linguistic protocol and for forming, in conformity with the linguistic protocol stored therein, second numbers of linguistic values of the output variables from the $u^nE$ combinations of the first numbers, the linguistic protocol being IF/THEN rules and the $u^nE$ combinations of the first numbers being an IF part of said rules and the second members being a THEN part of said rules;
rule evaluation circuit means for generating a weighting signal for each of $n_{LW}$ linguistic values of the output variables from the second numbers of linguistic values of the output variables and from the values of the membership functions of respective linguistic values of the output variables by means of circuit means for formation of a limited sum and maximum circuit means that serve as first and second circuits, respectively, for the formation of a nondistinct operation, one of the first and second circuits being used for the formation of the weighting signals dependent on an externally supplied rule evaluation select signal;
inference circuit means having a memory and the inference circuit means having circuit means for the formation of a limited sum and a maximum circuit means that serve as first and second, further circuits for the formation of a nondistinct operation, one of the first and second circuits being used for formation of signals for a nondistinct unification set at respective locations dependent on an externally suppliable inference select signal, and said inference circuit means forming signals for nondistinct unification sets at respective locations from the weighting signals for all locations of an area of distinct values of the output variables;
a defuzzification circuit means having a circuit for calculation of a center of gravity and a circuit for calculation of a mean of maxima that serve as first and second evaluation circuits, one of the first and second evaluation circuits being used for the formation of distinct values of the output variables dependent on an externally suppliable defuzzification select signal, said defuzzification circuit means generating the distinct, externally available values of the output variables from the signals for the nondistinct unification sets of all locations of the area of distinct values of the output variables; and
sequencer means for effecting that, after the $u^nE$ combinations of first numbers, the weighting signals for the $n_{LW}$ linguistic values of the output variables are calculated once for every set of distinct values of the $n_E$ input variables, said weighting signals being used in the inference circuit for all locations of the area of distinct values of the output variables.

18. The fuzzy logic controller according to claim 17, wherein the sequencer means also effects that nondistinct unification sets for already calculated locations of the area of distinct values of the output variables are simultaneously further-processed while a respective signal for the nondistinct unification set for a location of the area of distinct values of the output variables is calculated in the inference circuit means.

19. The fuzzy logic controller according to claim 17, wherein selection signals for definition of the input variables affected by a respective rule are additionally formed in the rule decoder means, wherein said selection signals are supplied to the rule evaluation circuit means, and wherein the rule decoder means is programmable logic.

20. The fuzzy logic controller according to claim 17, wherein at least one of the memory for the input variables and the memory for the output variables is a random-access memory.

* * * * *